United States Patent [19]

Wilson

[11] 4,259,788
[45] Apr. 7, 1981

[54] TESTING APPARATUS

[76] Inventor: Robert F. Wilson, 30W475 Fairway Dr., Naperville, Ill. 60540

[21] Appl. No.: 39,738

[22] Filed: May 16, 1979

[51] Int. Cl.³ ............................................. G09B 7/06
[52] U.S. Cl. .................................................... 434/338
[58] Field of Search ................ 35/9 C, 9 E; 273/237, 273/238

[56] References Cited

U.S. PATENT DOCUMENTS

| | | | |
|---|---|---|---|
| 3,097,435 | 7/1963 | Goldschmidt | 35/9 E |
| 3,100,352 | 8/1963 | Boissevain | 35/9 C |
| 3,106,784 | 10/1963 | Raley | 35/9 C |
| 3,477,144 | 11/1969 | Stillit | 35/9 C |

*Primary Examiner*—Charles N. Hart
*Assistant Examiner*—David R. Sadowski
*Attorney, Agent, or Firm*—James T. FitzGibbon

[57] ABSTRACT

A simplified testing apparatus comprising a test board assembly and an information display sheet. The board includes correct and incorrect answer circuits which are completed by placing a signal manually positionable answer selector unit through a selected aperture in the board. Each aperture registers with an associated answer terminal. Inserting the answer selector, through the selected aperture energizes an answer indicator. The invention display sheet contains a multiple answer format, with apertures being provided in the answer sheet for association with the apertures in the test board. The answer sheet is arranged so as to disguise the fact that there is a prearranged correct/incorrect answer circuit contained in the board. In a preferred form, a portion of the answer sheet consists of a plurality of flaps, the reverse side of which contains information explanatory of the answers. When the flap is folded so as to overlie a portion of the sheet, it cancels additional information on the principal portion of the answer sheet.

4 Claims, 4 Drawing Figures

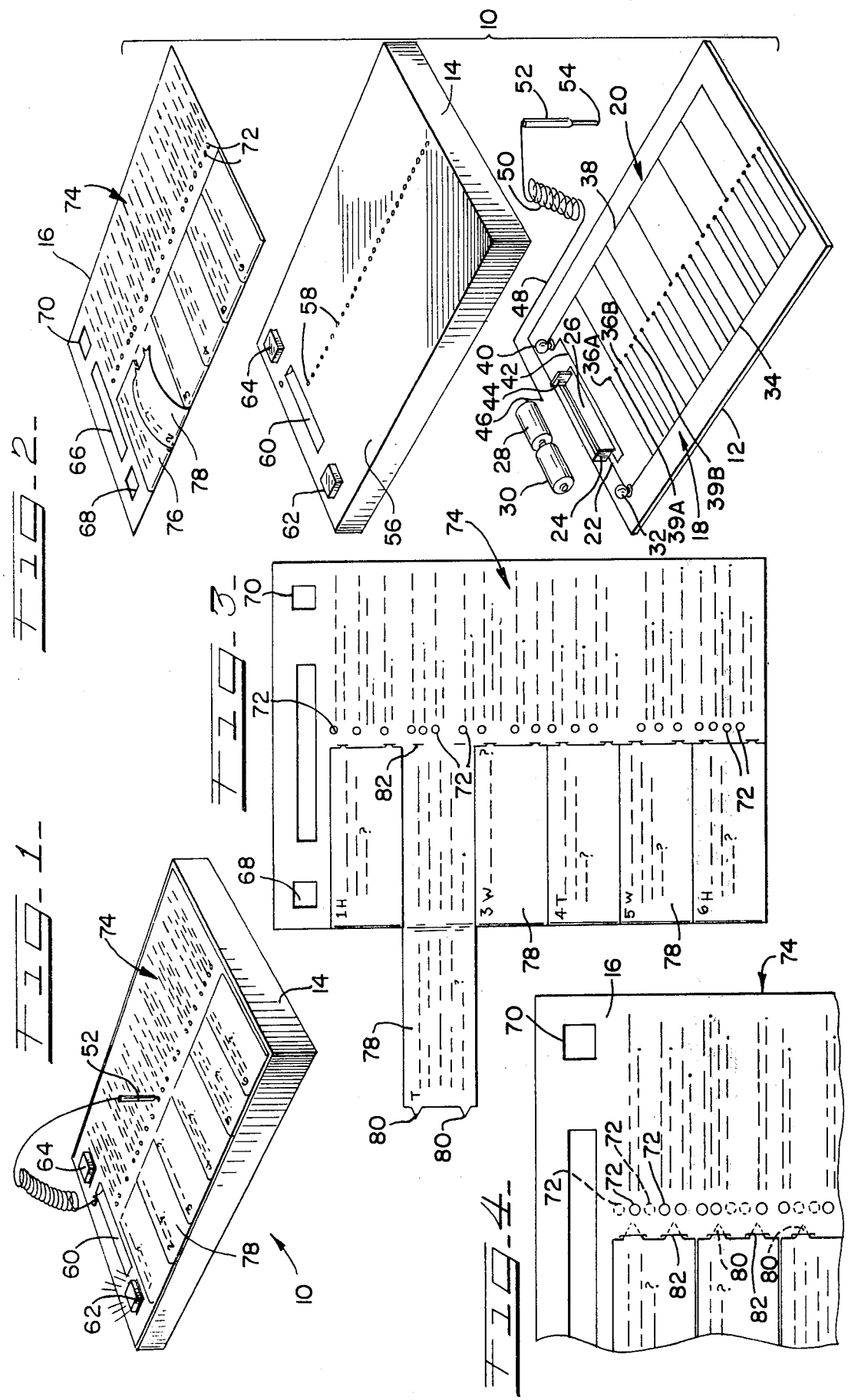

TESTING APPARATUS

BACKGROUND OF THE INVENTION

The invention relates generally to training, teaching, or demonstrating materials and apparatus, and more particularly, to an apparatus adapted to use replaceable, keyed, or coded materials in conjunction with a simple machine to administer tests for sales, marketing, or for general educational purposes. The unit is also adaptable for use in playing educational games.

While the apparatus of the invention has varied uses, one particularly advantageous use of the apparatus is in administering tests or pre-tests intended to arouse the interest of an individual being tested and to determine the degree to which such individual is aware of products being sold or marketed. With this knowledge, the marketer or salesperson can approach the sales prospect in an informed and effective way. For example, if it is desired to sell a product or a product line having a relatively technical character, such as a pharmaceutical or the like, it is helpful to determine whether the prospective purchaser is highly acquainted or relatively unacquainted with the characteristics of the product attempted to be sold.

A preliminary screening or acquaintanceship test is thus able to be used so that the most effect use of time can be made during a sales or marketing presentation. If a pharmaceutical salesman is calling upon a customer, it is advantageous to know, before making the sales presentation, whether the customer has had only a little, or perhaps considerable experience with the class of product being sold. If it is determined that the prospective purchaser is highly aware of most features of the product, the subsequent sales presentation can emphasize only certain particular advantages, while if it is known in advance of the presentation that the potential purchaser is not aware of certain features of the product of class of products being sold, then the sales presentation can concentrate on these areas.

According to the invention, a simple, straightforward, and yet interesting and challenging way of making this preliminary screening or determination can be accomplished.

In the preferred form of the invention, a simple board unit, which contains only two electrical circuits, is covered with a removable sheet or card of a particular design containing information in question-and-answer format, able to be answered by the prospect or student to be tested. Preferably, the cover sheet contains a front surface portion having multiple choice answers, a question portion contained on the reverse side of a folded or foldable flap, and a third or supplemental answer or explanation portion which is contained on a part of the answer sheet which the question-contained flap overlies.

One particular feature of the invention is that while the board portion of the electrical apparatus contains only one pre-programmed or "hard wired" answer sequence, whereby completing any one particular circuit always indicates a correct (or incorrect) answer, the paper component is arranged so that it may be indexed or positioned differently in relation to the board, disguising the fact that the answer sequence is fixed or predetermined.

Preferably, the board contains a battery as a source of energy, a stylus or like answer selector and a pair of light bulbs or other indicators, one for a correct answer, and one for an incorrect answer. The board, which further includes a series of openings for the stylus, is arranged so that when the stylus is placed in any one opening, either the correct or incorrect answer electrical circuit is completed, lighting the bulb and indicating the correctness of the answer.

If the board cover contains twenty openings and twenty insides terminals, of which for eample, the test material may contain twenty proposed answers, although it will usually contain fewer answers so as to disguise the fact that each board cover aperture is associated with either a correct or an incorrect answer. In other words one question and answer sheet might have provision for twenty multiple choice answers at terminals one through twenty, and another test paper might have only 17 answers, beginning with number 2 and ending with 18. Likewise, where there were 18 answers, the first answer may be at terminal 3 and the last one at 20, the first at one and the last at 18, etc.

Accordingly, in view of the subject taking the examination, the answering code is different for each different test. The fact that the answers are sequenced is easily disguised where the test material is being administered only intermittently or to a large number of different people, the fact that the correct answer code may be predetermined is not really a disadvantage.

The printed or test material portion is easy and inexpensive to produce, and is readily changed. It is held in position of use by registering a pair of open ends with bosses formed on the board cover and contains indicator-receiving apertures in various forms, with different test sheets perferably having different beginning and ending aperture positions.

In view of the need for a simplified teaching aid and testing apparatus, it is an object of the invention to provide an improved and simplified testing, pre-testing, or screening apparatus.

Another object of the invention is to provide a simplified test board apparatus adapted to removably receive the cover in a predetermined, indexed position of use, a sheet of printed matter, preferably in question-and-answer format sheet.

Another object of the invention is to provide an apertured sheet of printed matter, containing both displayed and concealed information, at least part of which is in question-and-answer format, and adapted to be indexed in a predetermined position of registration with apertures in an associated test board and adapted to indicate whether a selected answer is correct or incorrect.

Another object of the invention is to provide a simplified, pre-wired board having electrically energized answer indicators for correct and incorrect answers and a movable selector probe adapted to complete a circuit indicating right or wrong answers on test material.

Another object of the invention is to provide a simplified testing apparatus which is electrically arranged so as to indicate a correct answer when connections are made to one set of electrical terminals, to indicate an incorrect answer when connections are made to other terminals, and wherein the access to the various terminals is controlled by a board cover having apertures therein for receiving the end of an answer selector unit.

Another object of the invention is to provide a test apparatus and method which can utilize a simple, so-called hard wired testing machine adapted to provide a different apparent sequence of answers by using specially designed test materials adapted to be associated in use with the apparatus.

Another object of the invention is to provide a series of questions and answers on a printed matter element of a teaching or testing machine, with each question having concealed but individually accessible answer or bit of supplemental information for each of the questions presented.

These and other objects and advantages of the invention, including inherent objects and advantages, are achieved in practice by providing a testing apparatus having a correct and incorrect answer partial electrical circuits, an answer selecting probe for completing the circuit, and a question-and-answer containing sheet of printed matter received over the apparatus in a predetermined position of use and disguising the pre-wired nature of the machine and the relation thereof to correct and incorrect answers. The objects are also achieved by providing specially designed printed and punched test material sheets which include a question portion, and answer portion, and answer explanation or reinforcing portion. The exact manner in which these and other objects and advantages of the invention are achieved in practice will become more clearly apparent when reference is made to the following detailed description of a preferred embodiment of the invention set forth by way of example and shown in the accompanying drawings, in which like reference numbers indicate corresponding parts throughout.

BRIEF DESCRIPTION OF THE DRAWINGS

FIG. 1 is a perspective view of the testing apparatus of the invention, showing the printed matter portion overlying the board, with the answer indicator inserted through any apertures in the display sheet and in the underlying board cover;

FIG. 2 is an exploded perspective view showing the relation of the basic parts of the testing apparatus in relation to each other, including the board containing the electrical circuitry, the board cover and the printed matter portion;

FIG. 3 shows a preferred form of printed matter sheet suitable for use with the invention; and FIG. 4 is a fragmentary view, on an enlarged scale, showing the preferred manner of arranging the test material so as to indicate the locations of the question portion, the answer portion, and showing concealment of the explanation or answer reinforcing portion.

DESCRIPTION OF THE PREFERRED EMBODIMENTS OF THE INVENTION

While it will be understood that the invention may be repeated in different forms, a description of one form thereof will be given wherein a test board having electric circuitry is equipped with a specially design cover, and adapting for use with specially designed testing material.

Referring now to the drawings in greater detail, FIG. 1 shows a testing apparatus which may be utilized for either educational or recreational purposes. The apparatus is designed to test the knowledge of a user with regard to educational material, product material or other desired subject matter. After the user's knowledge has been tested, the device may also be used to provide answers to, or clarification of, the material tested to assist the participant in understanding precisely the material just reviewed or tested.

Referring now to FIG. 2, the electrical unit 10 is shown to comprise a printed circuit board 12, a board cover 14 and a custom designed, question and answer form 16. The board 12 is a so-called hard-wired board, i.e., it has predetermined electrical electrical connections of the type shown in FIG. 2.

These connections comprise an incorrect answer partial electric circuit generally designated 18, and a correct answer partial electric circuit 20. The incorrect answer circuit 18 includes a terminal 22 attached to one post 24 of a housing 26 adapted to receive a pair of batteries 28, 30. The incorrect answer circuit also includes means for indicating an incorrect answer in the form of a light bulb 32 placed in series circuit relation between the terminal 22 and a common conductor 34.

The conductor unit 34 is connected to an array of spaced apart contact terminals 36A, 36B, etc. which are aligned centrally of the board, and which extend from the top to the bottom when the board is in position of use with reading material thereover. The correct answer partial electric circuit 20 includes a common conductor 38, and a plurality of spaced apart contact terminals 39A, 39B, etc., interspersed with and aligned with their counterparts 36A, 36B, in the other circuit.

The circuit 20 also includes a light bulb 40 for indicating a correct or incorrect answer in series with conductor 38 and a terminal line 42 extending to the post 24 of the battery housing 26. This housing 26 also includes a second, opposite polarity terminal 44, to which is attached in use the end portion 46 of a conductor 48 having a flexible card portion 50 connected thereto and an answer indicator 52 having an electrically conductive end or terminating in tip portion 59.

As will be apparent, since the indicator 52 is electrically connected to one battery terminal 44, and the conductors 34, 48 to the other battery terminal 26, when the tip 59 is connected to a terminal, one light bulb or the other will be energized, depending upon whether the correct answer or the incorrect answer circuit is completed. The circuits are referred to herein as partial circuits because they are incomplete until such time as continuity is achieved by placing the conductive tip on a contact terminal as just described. As shown, the ratio of incorrect answers to correct answers is commonly of the order of three or four to one.

Referring now to another element, the board cover 14, in the illustrated form, this unit comprises a simple, box-like cover containing a flat top surface portion 56, a plurality of apertures 58 aligned centrally thereof in spaced apart relation, a cover 60 for the battery housing and a pair of combination paper indexing and indicator light housing units 62, 64. In use, the cover unit 14 is removably snap fitted over the board 12 which contains the electrical circuitry; however, it is clear that these parts may be arranged in any other convenient manner.

Referring now to still another element, the question, answer, and supplemental information display sheet 16, this unit is shown to include a sheet top surface portion 66, openings 68, 70, for reception over the housings 62, 64 to -ocate the sheet precisely in place, and a plurality of apertures 72 extending through the face of the sheet. For at least each aperture in the test sheet 16 there is an aperture 58 in the board cover. The right hand side of the sheet 16 contains a plurality of answers, generally indicated 74 and each having a key number of letter opposite the associated aperture 72. In the preferred embodiment, the right hand side of the form 16 contains a plurality of individual, foldable flaps, such as flaps 76, 78, each containing printed matter thereon in such a manner that, when the flap is folded so as to overlie the left hand portion of the answer sheet 16, a question is presented to the viewer. As shown in FIGS. 3 and 4, each individual flap, such as the flap 78, includes one or more tabs 80 adapted to be received in slots 82 in the sheet 16 so as to hold the flap in the folded over position. FIG. 3 shows a feature of the invention which comprises printing supplemental or answer-explaining information on the left hand side of the sheet, and, if desired, also printing such information on the reverse side of the flap 78. Accordingly, access to the information lying beneath the question may be had as to each individual question by simply folding the flap about the vertically extending hinge line to an open position to expose the contents of the sheet.

In the use of the device as just described, a sheet 16 containing test material is positioned with the flaps in the folded over relationship illustrated in FIG. 1, and the sheet 16 is indexed in a desired position of use by registering the openings 68, 70 with housings 62, 64. The user or subject to be tested examines the questions set forth on the left side of the page, then scans the answers presented on the right side of the page, and makes a choice of one selected answer.

At this point, he inserts the conductive tip 59 of the answer selector or probe unit 52 through a selected sheet aperture 72 and through the cover aperture 52 lying therebeneath. When the tip 59 contacts one of the terminals 36a, 36b, etc. one or the other of the circuits will be energized and the light will flash, indicating that a correct or incorrect answer has been given.

If the subject has made an incorrect answer, he usually attempts another answer, finally determining which is correct. Thereafter, he may loosen the flap from its folded over position and study the portion of the sheet therebeneath, including whatever printed matter lies the reverse side of the flap as illustrated in FIG. 3.

Referring now to FIG. 4, it is shown that, by making suitable arrangements of the printed matter portion of the testing apparatus, that is, by arranging the sheet differently, the fact that the board is hard-wired or contains a fixed relation between correct and incorrect answers can be disguised from the student.

In FIG. 4, a solid line aperture 72 indicates that there are apertures in both the paper and in the board. Where the aperture is shown in a dotted line, it will be understood that there is an aperture 58 in the board but not in the cover sheet. Accordingly, the person viewing the test has available, among the several choices presented to him, only those which include a paper aperture 72.

Referring again to FIG. 4, it is shown that the first answer referred to in the printed sheet is actually associated in use with the second aperture 58 in the board cover 14. FIG. 4 also shows that where the apertures 72 in the paper 16 periodically skip or miss one or more of the underlying apertures 58, a random aspect is given to the test which disguises the prewired answering sequence thereof. Consequently, where it is desired to test a plurality of students, it is easy to provide printed material using less than all of the available apertures 58.

Fewer numbers may be used either by starting at an aperture other than the top one, ending at other than the bottom one, or omitting various apertures along the extent of the array of apertures, which is shown in this case to comprise a straight line extending longitudinally of the middle of the apparatus. Of course, it will be understood that the exact location of the apertures for the answer is not critical to the operation of the unit, nor is the particular construction of the flap members or the like. The provision of registration opening 68, 70 in the sheet 16 insures that such sheets will be placed in an aligned or registered position rather than moved about in use, which would interfere with the accuracy of the device.

Although the unit just described has been shown as having light bulbs to indicate that the answer is correct or incorrect, but it will be understood that other indicating means may be used, such as light emitting diodes, noise makers, or other condition responsive devices.

Other variations may also be incorporated, such as providing two, three or more different lights, including lights of different colors, depending on the size and complexity of the program, the nature of the material in question, etc. The printed circuit can be altered so as to make the necessary connections to such bulbs, said each bulb having its own, individual partial circuit constructed in the same or similar manner as the circuits just described.

In some cases, the batteries may be mounted on the bottom of the printed circuit board, allowing the printed circuit to mount flush with the bottom of the case.

The answer indicator or probe is shown as coming directly from a terminal but may come from the side or top of the case as desired.

Referring to the printed material, two locking tabs are shown for each flap, but in some cases, one would be sufficient. The transparent top portion of the bulb housing may have an insert thereover made from an acetate or other clear material and containing instructions which are visible only when the associated light is illuminated. Such instructions might advise opening the flap or the like. As printed out, the unit may be used as a game, as an educational device, or as a sale or marketing aid. The game aspect is helpful in making sales presentations, while the supplemental or background information associated with the answer may be used in various ways. The answer and/or the supplemental information can contain a detailed presentation, of complex material, thus be highly educational, even though the question itself may be relatively easy to answer. In such case, the question-answer aspect is less important, however where the testing aspect is more important that the presentation, the question-answer portion may be made correspondingly more difficult.

It was thus be seen that the present invention provides a novel training, teaching, or demonstrating materials and apparatus, having a number of advantages and characteristics including those pointed out above and others which are inherent in the invention. A preferred embodiment of the invention having been described by way of illustration, it is anticipated that changes and modifications of the described training, teaching, and demonstrating materials and apparatus will occur to those skilled in the art and that such changes and modifications may be made without departing from the spirit of the invention or the scope of the appended claims.

What is claimed is:

1. A test apparatus comprising, in combination, a test board assembly and an information display sheet, said test board assembly comprising an energy source having first and second source terminals, and a correct answer electrical circuit having one terminal thereof connected to said first source terminal, a first conductor element extending along one side of said board assembly and answer indicator means in series circuit relation between said one terminal and said first conductor, said conductor having a plurality of individual contact terminals in parallel with each other and arranged physically so as to lie along a given locus in spaced apart relation, an incorrect answer electrical circuit having one terminal thereof also connected to said first source terminal, a second conductor element extending along another side of said board assembly and answer indicator means in series circuit relation between said first source terminal and said second conductor, said conductor also having a plurality of individual contact terminals in parallel circuit relation to each other and arranged to lie along said given locus interspersed with said contact terminals in said correct answer circuit, said given locus extending generally centrally of said board assembly with said individual contact terminals comprising conductive strips extending respectively to either side of said board for connection with said first and second conductor elements, respectively, and a circuit completing assembly with one portion thereof connected to said second source terminal, said circuit completing assembly also including a single manually positionable answer selector unit having a conductive end portion, a board cover unit having a plurality of apertures, each being in a position of registration with an associated answer circuit terminal, whereby inserting said conductive end portion of said answer selector through one of said apertures and into contact with one of said answer circuit terminals will complete one of said correct and incorrect answer circuits and energize said answer indicator means, said information display sheet containing visually perceptible information on said display sheet in multiple answer format, and a plurality of apertures corresponding to and in registry with at least some of said board cover apertures, each sheet aperture being associated with a corresponding answer, with said correct and incorrect answer circuits and said information being constructed and arranged so that upon insertion of said answer selector into a given aperture, said answer indicator means will be energized so as to indicate whether the selected answer is correct or incorrect.

2. An apparatus as defined in claim 1 wherein said plurality of apertures in said information display sheet is fewer than the number of apertures in said test board assembly, whereby at least some of said apertures in said test board assembly are inaccessible to said answer indicator.

3. An apparatus as defined in claim 1 wherein said information display sheet comprises a facing side and a reverse side, and three principal information display areas, one of which said areas being an answer area arranged on one portion of said sheet, a supplemental information area lying in adjacent and parallel relation to said answer display area and on the same face of said sheet as said answer area, and a question area contained on the reverse side of a foldable flap joined to said display sheet along the hinge line lying parallel to said other two areas, whereby, in use, said question containing flap may be folded so as to overlie said supplemental information area and thus present only question and answers to the user, said flap also being movable about said hinge line to an open position so as to expose said supplemental information to said user.

4. An apparatus as defined in claim 3 wherein said at least one foldable flap comprises a plurality of individual flaps, and wherein means is provided on said sheet so as to retain said flap in said folded over position.

* * * * *

UNITED STATES PATENT OFFICE
CERTIFICATE OF CORRECTION

Patent No. 4,259,788   Dated April 7, 1981

Inventor(s) Robert F. Wilson

It is certified that error appears in the above-identified patent and that said Letters Patent are hereby corrected as shown below:

Column 1, line 38, after the word "product", "of" should be changed to -- or --;

Column 4, line 65, the word "of" should be -- or --.

Signed and Sealed this

Fourteenth Day of July 1981

[SEAL]

Attest:

Attesting Officer

GERALD J. MOSSINGHOFF

Commissioner of Patents and Trademarks